United States Patent
Hartelius

(10) Patent No.: US 9,609,845 B2
(45) Date of Patent: Apr. 4, 2017

(54) PORTABLE PET CARRIER RESTRAINT SYSTEM

(71) Applicant: Quaker Pet Group, LLC, Denver, CO (US)

(72) Inventor: Mark Hartelius, Chicago, IL (US)

(73) Assignee: Quaker Pet Group, LLC, Denver, CO (US)

( * ) Notice: Subject to any disclaimer, the term of this patent is extended or adjusted under 35 U.S.C. 154(b) by 21 days.

(21) Appl. No.: 14/596,066

(22) Filed: Jan. 13, 2015

(65) Prior Publication Data

US 2015/0230424 A1 Aug. 20, 2015

Related U.S. Application Data

(60) Provisional application No. 61/926,925, filed on Jan. 13, 2014.

(51) Int. Cl.
*A01K 1/02* (2006.01)
*B60R 7/04* (2006.01)
*B60R 22/10* (2006.01)

(52) U.S. Cl.
CPC ............ *A01K 1/0272* (2013.01); *B60R 7/043* (2013.01); *B60R 22/10* (2013.01)

(58) Field of Classification Search
CPC .... A01K 1/0236; A01K 1/0272; B60R 7/043; B60R 22/10
USPC ........................................................ 119/771
See application file for complete search history.

(56) References Cited

U.S. PATENT DOCUMENTS

| | | | | |
|---|---|---|---|---|
| 4,943,105 A * | 7/1990 | Kacar | ................. | A01K 1/0272 119/28.5 |
| 5,005,526 A * | 4/1991 | Parker | ................. | A01K 1/0272 119/751 |
| 6,079,773 A * | 6/2000 | Hassan | ................... | B60R 7/043 297/112 |
| 6,276,582 B1 * | 8/2001 | Alexander | ............. | B60R 7/043 217/16 |
| 7,429,078 B1 * | 9/2008 | Tarlow | ................... | B60R 7/043 224/275 |
| 8,607,735 B1 * | 12/2013 | Klinker | ................ | A01K 1/0272 119/28.5 |
| 2009/0126638 A1 * | 5/2009 | Bennett | ................ | A01K 1/0272 119/28.5 |
| 2010/0288204 A1 * | 11/2010 | Costello | .............. | A01K 1/0272 119/453 |
| 2012/0235451 A1 * | 9/2012 | Hrdlicka | ................. | B60R 7/043 297/188.2 |
| 2012/0312251 A1 * | 12/2012 | Udebiuwa | ............... | B60R 22/10 119/771 |

(Continued)

FOREIGN PATENT DOCUMENTS

DE 102004056251 A1 * 5/2006 ............. B60R 7/043
FR 2642711 A1 * 8/1990 .......... A01K 1/0272

*Primary Examiner* — Ryan Kwiecinski
(74) *Attorney, Agent, or Firm* — Dorsey & Whitney LLP

(57) ABSTRACT

An adjustable pet carrier restraint is configured to accept various sizes, shapes, and configurations of pet carriers. The pet carrier restraint is tethered to a vehicle's child seat restraint system anchors to secure the pet carrier at up to three points. The pet carrier restraint is collapsible and may be positioned against a seat back when no pet carrier is secured therein to allow human passengers to comfortably be seated in the same seat without removal of the pet carrier restraint.

22 Claims, 15 Drawing Sheets

(56) References Cited

U.S. PATENT DOCUMENTS

| | | | | |
|---|---|---|---|---|
| 2014/0102377 A1* | 4/2014 | Hoffman | ............. | A01K 1/0035 |
| | | | | 119/496 |
| 2015/0013614 A1* | 1/2015 | Salzmann | ............ | A01K 1/0035 |
| | | | | 119/453 |
| 2015/0264887 A1* | 9/2015 | Parness | ................ | A01K 1/0272 |
| | | | | 297/180.14 |

* cited by examiner

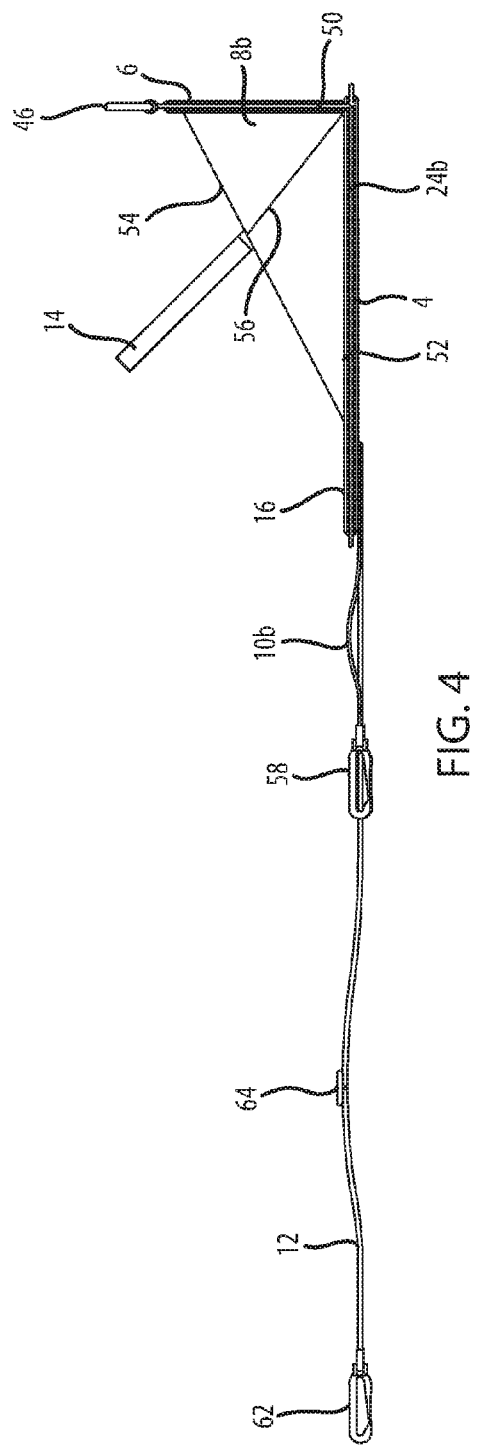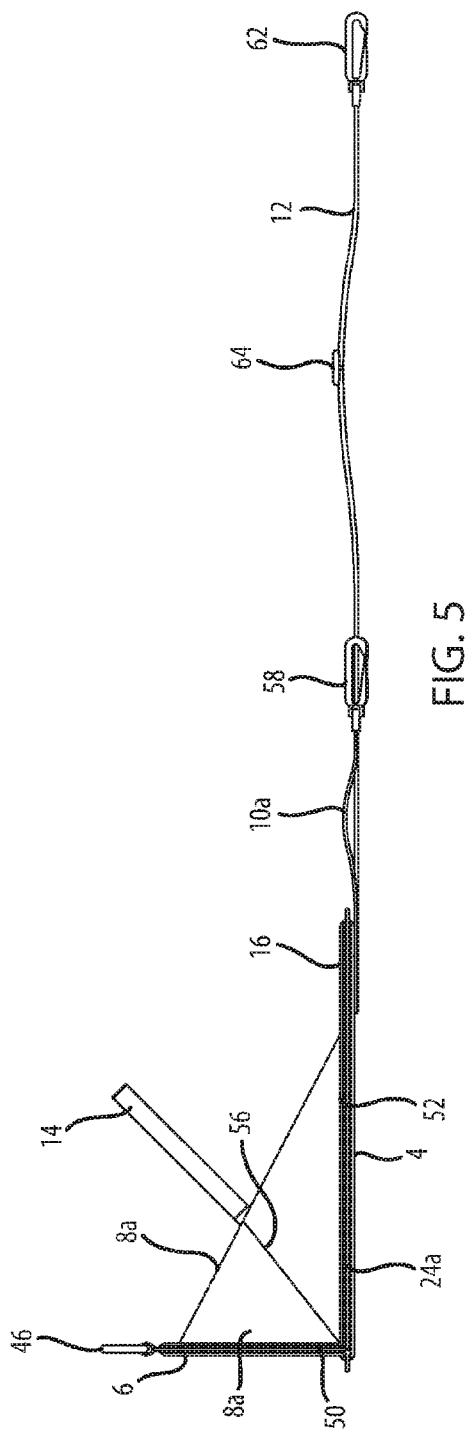

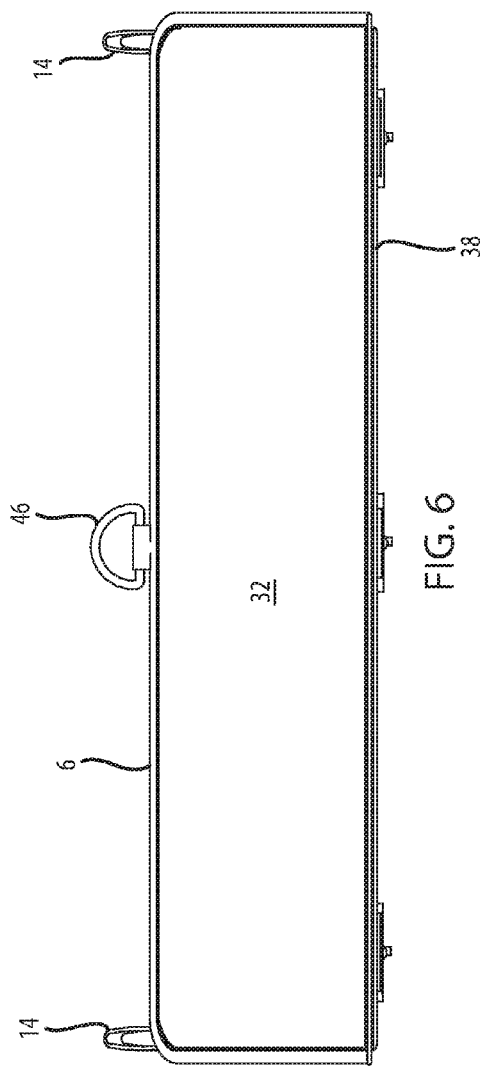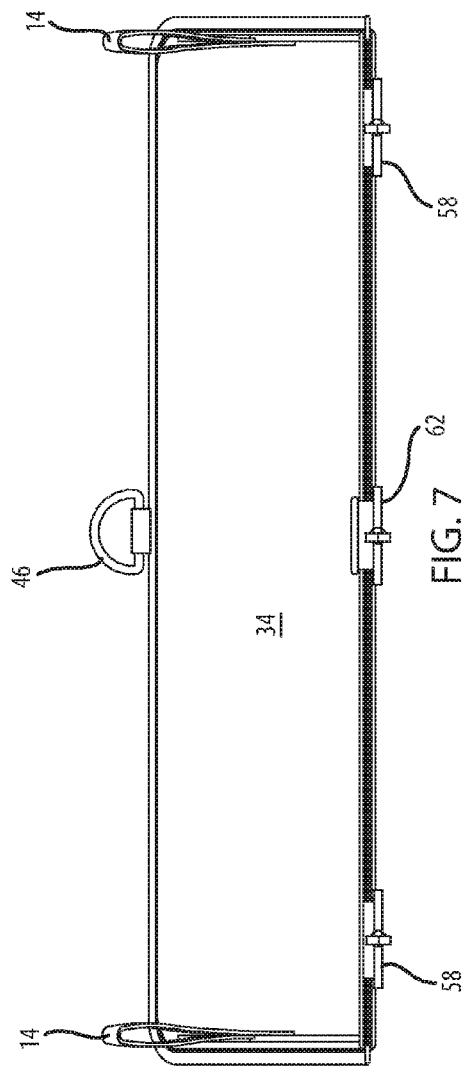

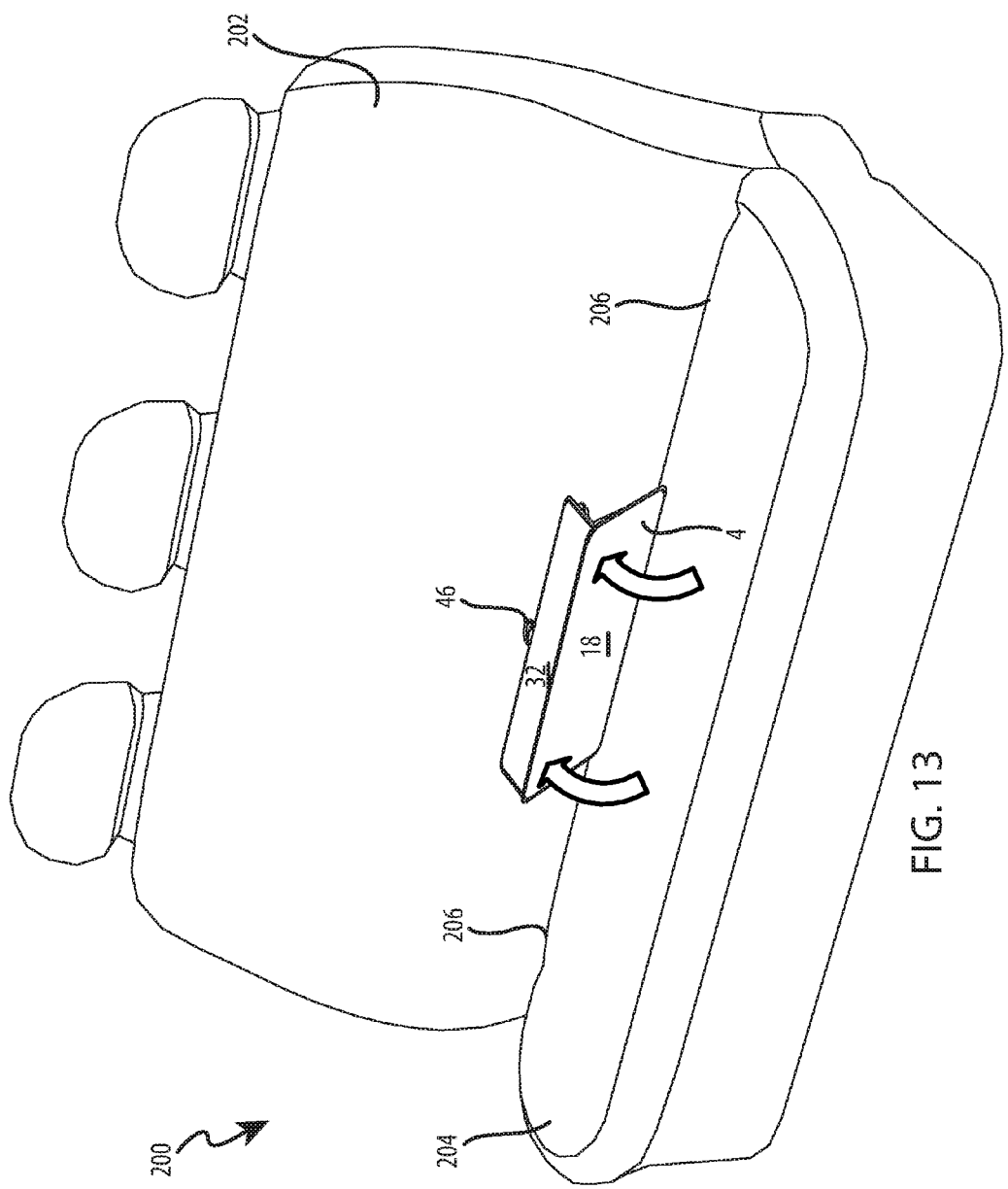

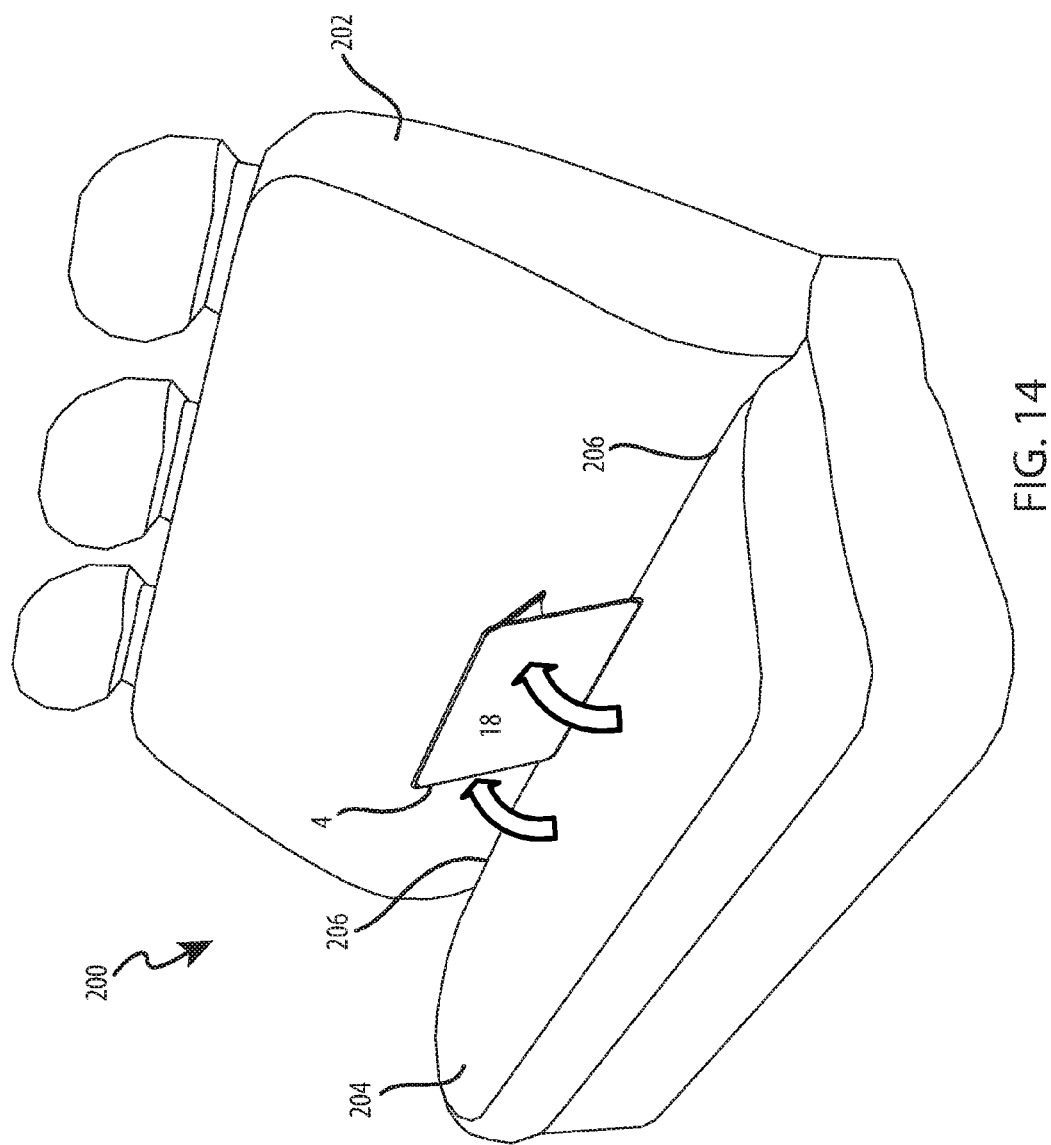

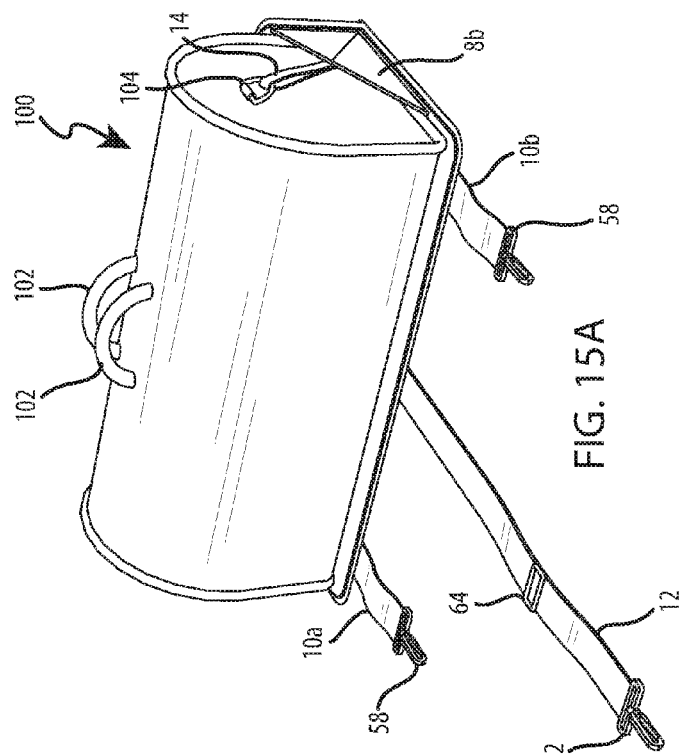
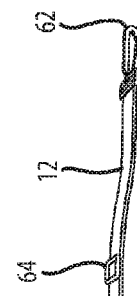
FIG. 15A
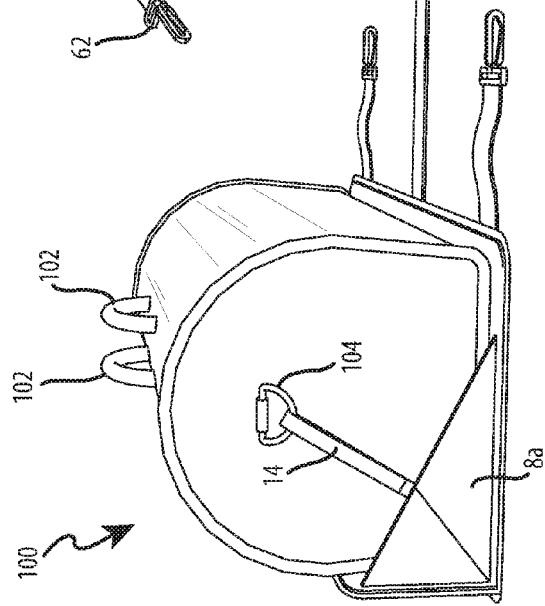
FIG. 15B

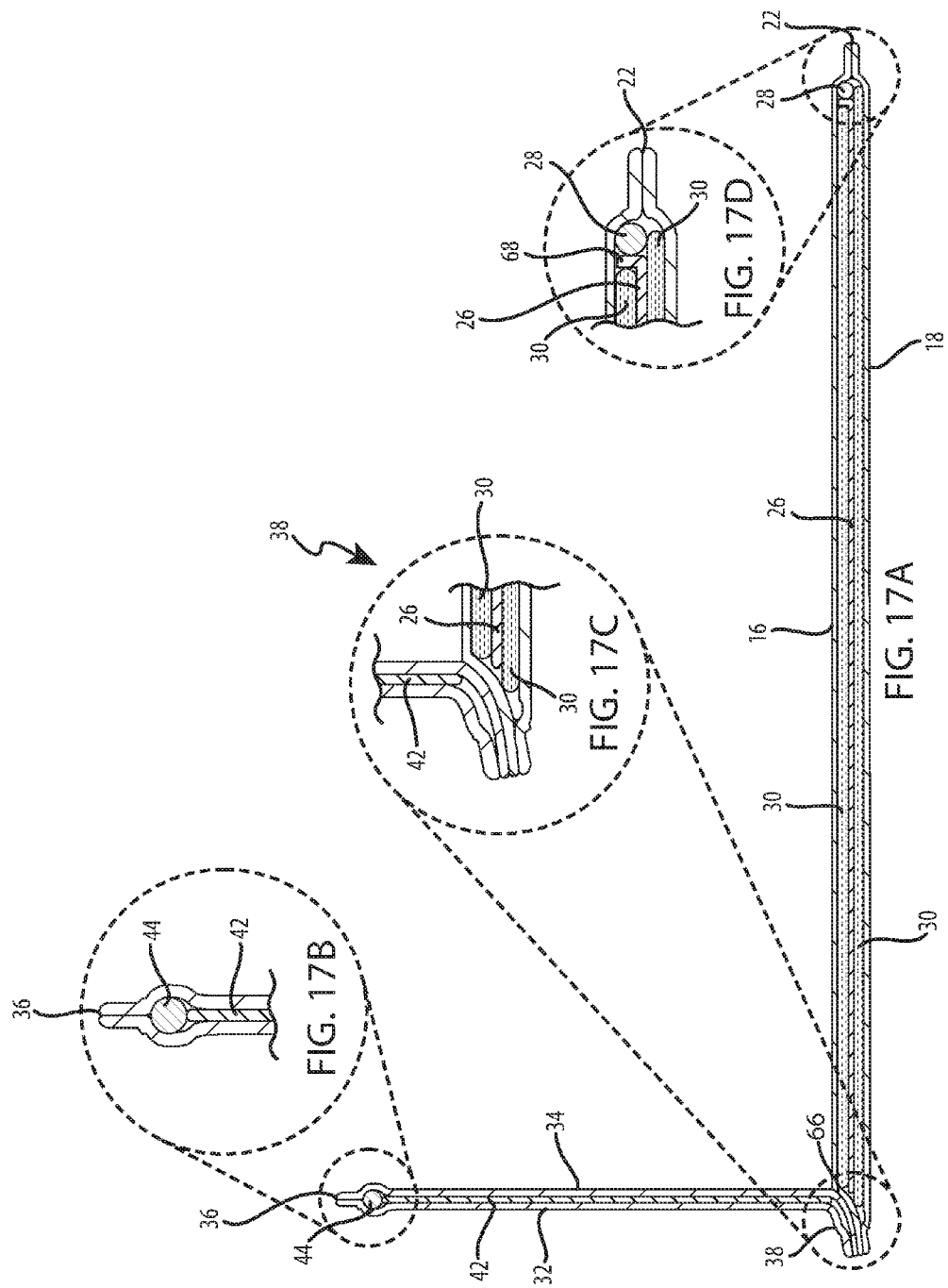

PORTABLE PET CARRIER RESTRAINT SYSTEM

CROSS-REFERENCE TO RELATED APPLICATION

This application claims priority to U.S. Provisional Application No. 61/926,925, filed on Jan. 13, 2014, and entitled "Portable Pet Carrier Restraint System," which is hereby incorporated by reference in its entirety for all purposes.

FIELD

The disclosed processes, methods, and systems are directed to enhancing the safety of pets and animals during transportation.

BACKGROUND

Many animals, for example household pets, may be transported by use of a pet carrier. These carriers, which may be of various shapes and sizes, provide familiar and comfortable environments for the pet. In addition, pet carriers are convenient for pet owners because the owner is able to confine the pet to a safe, defined space that may be easily carried/transported by the owner. In some cases, pet carriers can be lifted by the owner by handles or shoulder straps attached to the pet carrier. When the pet is to be transported by automobile, the owner may place the pet carrier within the car. Like human passengers animals should be restrained in moving vehicles for the safety and well-being of the pet, as well as the safety of human passengers.

Most automobiles include restraint systems that are built into the automobile. The restraint systems help to protect the human occupants from excessive movement during acceleration, deceleration, and turning. The restraint systems may also help to prevent injury in case of an accident. Seat belts are one type of restraint system. In the case of infants and small children that must ride in a car seat, modern automobiles have restraint systems designed to anchor the child seat to the car. Modern child seat restraint systems in Europe and the United States include a number of anchors points to which car seats, and car seat bases may be reversibly and securely tethered. For example, the lower anchors and tethers for children (LATCH) restraint system may be used to secure a child's seat to the car.

The information included in this Background section of the specification, including any references cited herein and any description or discussion thereof, is included for technical reference purposes only and is not to be regarded subject matter by which the scope of the invention is to be bound.

SUMMARY

A pet carrier restraint device is disclosed for securing a pet carrier to an automobile restraint system. The device can use an automobile restraint system within the vehicle to help restrain a pet carrier. Because pet carriers may be various shapes and sizes, the carrier restraint system is adaptable to various makes and models of pet carriers.

In one exemplary implementation, the pet carrier restraint comprises a base panel, a front panel, two side panels, anchor tethers, and one or more securing straps. The base panel may include a rear edge, an upper surface covering, a lower surface covering, a base insert, a compressible material, and a frame positioned between the upper and lower surface coverings. The front panel, defined by a front surface covering and a back surface covering, is hinged at a bottom edge to a front edge of the base. A connector ring or other connection structure may be positioned at a top edge of the front panel. A front insert and a front frame are positioned between the front surface covering and the back surface covering of the front panel. One or more side panels are hinged to a respective to a side edge of the front panel and a corresponding side edge of the base panel.

In some embodiments, one or more anchor tethers may be provided for securing the pet carrier restraint to a vehicle restraint system. In these embodiments, the anchor tethers are fixed to the base panel and connected to the base frame. The anchor tethers have a fastener at a free end away from the base. Additionally, one or more over-carrier straps may be provided for securing the pet carrier to the pet carrier restraint. An over-carrier strap may be attached at or near the rear edge of the base panel. The over-carrier strap length may be adjustable. One or more side-securing straps may be attached to each side panel or the lateral sides of the base and designed to engage a shoulder strap attachment structure on a pet carrier or otherwise connect to ends of a pet carrier.

An exemplary method of containing a pet in a vehicle using the described pet carrier restraint device is also disclosed. A pet may be placed in a pet carrier or may be placed in the carrier after the carrier is secured in the vehicle. The pet carrier restraint may be placed on a seat in the vehicle and secured to the vehicle by attaching the anchor tethers extending from the rear of the base of the pet carrier restraint device to the vehicle restraint system (e.g., a LATCH system) in the crease or bight of the seat. The front panel may be raised from a folded position against the base and the pet carrier may be placed upon the base between the front panel and a seat back of the vehicle seat and further between the two side panels. An over-carrier strap attached to the rear of the base may be placed over the top of the pet carrier and connected with the connector structure on the front panel. The length of the over-carrier strap may be adjusted to pull the over-carrier strap snugly against the pet carrier. The side-securing straps may be attached to shoulder strap connectors on each end of the pet carrier to further secure the pet carrier to the pet carrier restraint device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 4 is a right elevation view of the pet carrier restraint of FIG. 1.

FIG. 5 is a left elevation view of the pet carrier restraint embodiment shown in FIG. 1.

FIG. 6 is a front elevation view of the pet carrier restraint embodiment shown in FIG. 1.

FIG. 7 is a rear elevation view of the pet carrier restraint embodiment shown in FIG. 1.

FIG. 13 is a front isometric view of the pet carrier restraint of FIG. 12 in a partially collapsed configuration and partially repositioned against the seat back.

FIG. 14 is a front isometric view of the pet carrier restraint of FIG. 13 in a further collapsed position against the seat back.

FIG. 15A is a rear isometric view of the pet carrier restraint of FIG. 1 with a pet carrier engaged by side-securing straps threaded through the pet carrier D-rings.

FIG. 15B is a right isometric view of the pet carrier and pet carrier restraint of FIG. 15A.

FIG. 17A is a cross-section view of the pet carrier restraint taken along line 17A-17A in FIG. 1.

FIGS. 17B-17E are various enlarged views of the cross-section view of FIG. 17A.

DETAILED DESCRIPTION

Figure 1:
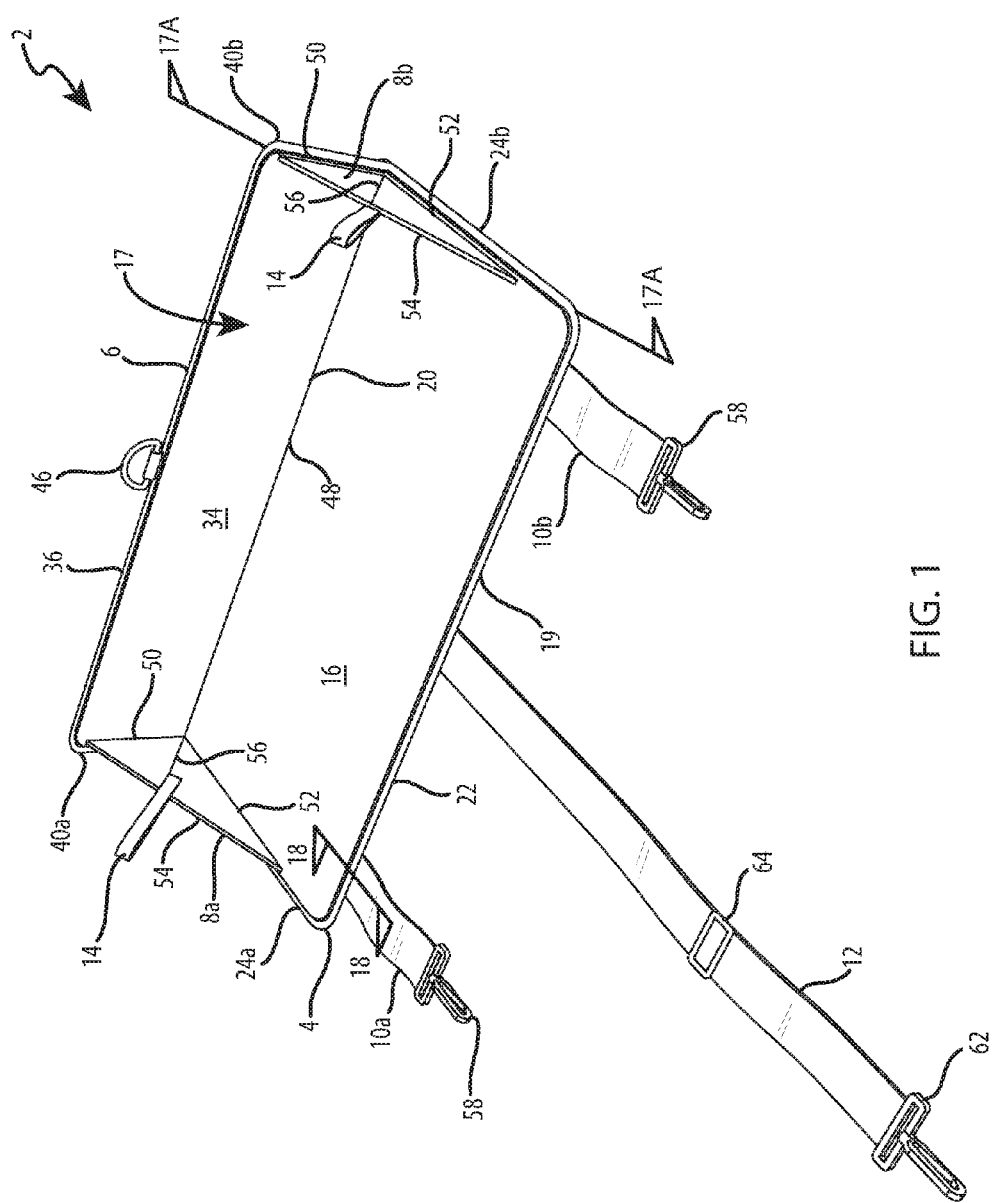
FIG. 1 is an isometric view of one exemplary embodiment of the disclosed pet carrier restraint device.
Figure 2:
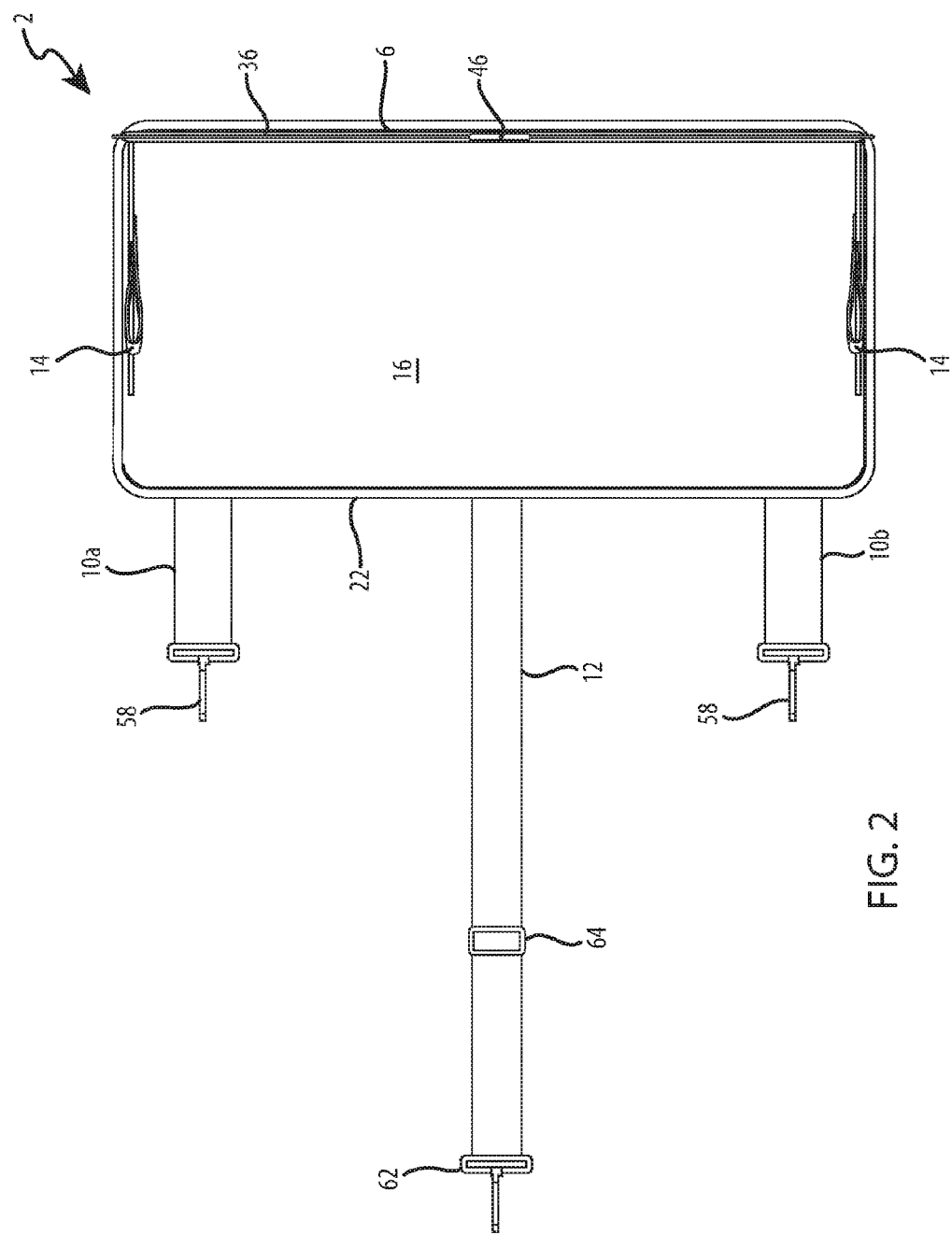
FIG. 2 is a top plan view of the pet carrier restraint of FIG. 1.

The present disclosure is directed to a restraint system for animals. In some embodiments, the restraint system may be used to secure one or more animals within an automobile to help prevent the animals from moving undesirably within the automobile, which may assist in reducing or preventing injuries to the animals in the event of an automobile accident or sudden changes of speed or direction. In one embodiment, the restraint system may include a carrier restraint and an animal carrier. In this embodiment, the carrier restraint is secured to the automobile, such as to one or more latches or the like within the automobile, and the animal carrier is then releasably secured to the carrier restraint. The carrier restraint defines or restricts the movement of the carrier within the automobile, but simultaneously allows the carrier to be quickly and easily removed from the carrier restraint. The carrier restraint may does not have to be disconnected from the automobile when the carrier is removed, which allows a person to remove the carrier from the automobile without having to readjust or re-secure the carrier restraint in the automobile when reinserting the carrier into the automobile.

In some embodiments, the carrier restraint may include a floor panel, a lip or front wall, and two sidewalls. In this embodiment, the flood panel may be positioned on top surface of a seat within an automobile, with the floor panel being parallel to and spaced apart from the seat back, and the two sidewalls extending substantially perpendicularly between the lip and the seat back. In this configuration, when the animal carrier is secured to the carrier restraint, the lip and the seat back act to limit movement of the animal carrier along a first axis and the sidewalls act to limit movement of the animal carrier along a second axis. The carrier restraint may define a floating compression or tensegrity structure such that the various rigid supports within each of the panels may be isolated from one another but contained within a structure of continuous tension. This structure assists in enhancing the rigidity of the restraint and helps the restraint maintain the carrier in a desired location within the automobile, even when subjected to strong forces due to vehicle movement.

In some embodiments, the sidewalls of the carrier restraint may be selectively collapsible to allow the carrier restraint to transition from a first position to a second or collapsed position. In the collapsed position, the floor panel may be oriented substantially parallel to the seat back and the carrier restraint may be sufficiently collapsed to allow a person to sit comfortably in the seat where the restraint is installed without requiring that the restraint be removed.

The carrier restraint may include one or more releasable connectors that secure a carrier to the carrier restraint. The connectors may be expandable or otherwise vary in dimension to accommodate various sizes and shapes of the carrier. The location and type of connectors may be varied based on the desired carrier to be used with the carrier restraint.

The restraint system may also include a pet carrier. The pet carrier may be configured to receive and contain an animal, such as a dog or a cat. The pet carrier may be substantially any type of carrier and the carrier restraint may be modified to match one or more dimensions and shapes the pet carrier. It should be noted that while many embodiments of the pet carrier restraint 2 may be used to secure objects used to transport animals, in other embodiments the carrier restraint 2 may be used to secure various other containers, objects, luggage, or the like, during transportation. For example, some purses may have an open or non-closable top end and may spill the contents when tilted or knocked over. In these instances, the restraint system of the present disclosure may be used to secure the purses in a desired orientation and help prevent spillage of the contents.

Turning now to the figures, a carrier restraint in accordance with the present disclosure will be discussed in more detail. FIGS. 1-7 illustrate various views of a carrier restraint. With reference to FIG. 1-7, the carrier restraint 2 may include a base panel 4, a front panel 6, left side panel 8a, right side panel, 8b and a plurality of securing fasteners, such as tethers and/or straps. The base or floor panel defines a bottom of the carrier restraint 2 and the front panel defines a front support for the carrier restraint 2. The side panels define sidewalls for the carrier restraint 2. When installed, the combination of the panels and the outer surface of the back of the car seat define a carrier cavity 17 in which a pet carrier can be positioned and restrained. As will be discussed in more detail below, the securing fasteners may aid in securing the pet carrier restraint 2 within a vehicle and/or securing a carrier to the pet carrier restraint 2 (see, e.g., FIGS. 10 and 12-14).

The pet carrier restraint 2 secures a pet carrier in an automobile or other vehicle, by engaging one or more anchor points in a restraint system within the vehicle. The base panel 4, front panel 6, and side panels 8a/b aid in reducing forward and lateral movement of the pet carrier during transport. In other words, the panels 4, 6, 8a/b may restrict or limit the movement of the pet carrier during transport. In many embodiments, the front panel 6 is positioned substantially perpendicular to the base panel 4 to inhibit forward movement of a pet carrier seated on the base panel 4. For example, the front panel 6 may prevent forward movement of the pet carrier, such as towards the edge of the seat. The disclosed carrier restraint may be used with a variety of pet carrier models from various pet carrier makers.

As mentioned, the carrier restraint 2 may be designed to securely engage an infant or child seat restraint in a vehicle and distribute associated forces and stresses throughout the pet carrier restraint 2. The force distribution and security in the vehicle due attachment to the child restraint features helps to ensure that the carrier restraint 2 does not move, even during sudden movements of the vehicle (e.g., sharp turns, stops, or during impact). In many embodiments, the pet carrier restraint 2 system may be designed to engage one or more anchor points of a child safety seat system, for example an ISOFIX or LATCH multipoint restraint system, this will be discussed in more detail below.

Some embodiments of the disclosed pet carrier restraint 2 system may be collapsible. The front panel 6 may be folded from a perpendicular orientation with the base panel 4 such that the orientation is at a smaller angle and close to parallel. This configuration may allow the pet carrier restraint 2 to be folded upward such that it can be positioned against the seat back 202 of the vehicle seat 200. In these embodiments, the collapsible pet carrier restraint 2 may allow human passengers to be seated and restrained in front of the collapsed pet carrier restraint 2 without having to remove the pet carrier restraint 2 or having a passenger seated on the pet carrier restraint 2. In some embodiments, the base panel 4 may be cushioned so that in the collapsed position, the base panel may provide additional cushioning for a human passenger seated in the seat where the carrier restraint is installed.

Each of the components for the carrier restraint system will now be discussed in turn below.

Base Panel

The base panel 4 will now be discussed in more detail. FIG. 17A is a cross-section view of the base panel 4 taken along line 17A-17A in FIG. 1. With reference to FIGS. 1-3 and 17, the base panel 4 of the pet restraint carrier 2 is defined by a front edge 20, a rear edge 22, and lateral side edges 24a/b. The base panel 4 defines a floor or bottom surface of the carrier restraint 2. The base panel 4 may include an upper surface covering 16, a lower surface covering 18, a base insert 26, and a base frame 28. The upper and lower surface coverings 16, 18 of the base panel 4 may be made of a fabric. In many embodiments, the fabric of the upper and lower surface coverings 16, 18 of the base panel 4 may be a durable fabric, which may comprise natural and synthetic fibers, for example cotton, polyester, nylon, rayon etc. The perimeter edges of the upper and lower surface coverings 16, 18 may be sewn together at seams 66 at the front, rear, and lateral side edges 20, 22, 24a/b to retain the base insert 26 and base frame 28 between the upper and lower surface coverings 16, 18. In other embodiments, the perimeter edges of the upper and lower surface coverings 16, 18 may be attached in any of a number of ways, e.g., adhesive, hook and loop closures, heat seal, staples, etc.

The upper surface covering 16 of the base panel 4 may be designed to support a pet carrier and the lower surface covering 18 may be designed to rest on a surface, for example the seat cushion 204 of a car seat 200. The base insert 26 may be similar in size and shape to the base panel 4 and may define a rigid and generally flat structure positioned within the base panel 4 between the upper and lower surface coverings 16, 18 to aid in maintaining the shape of the base panel 4. For example, the base insert 26 may be a partially rigid or substantially rigid material that increases the rigidity of the carrier restraint 2.

In some embodiments, the base insert 26 may be formed with an edge wall 68 or lip or bead of a greater thickness than the base insert 26 extending toward the upper surface covering 16 around all or a portion of the perimeter of the base insert 26. The lip around the perimeter of the base insert 26 may help align placement of the pet carrier when placed upon the base panel 4 of the pet carrier restraint 2. Additionally, the lip 19 may define a curb or barrier that helps to keep the carrier within the carrier cavity 17 defined by the carrier restraint 2. The lip 19 may vary in height depending on type of carrier used and other factors.

The base frame 28 may be positioned at or near one or more sides of the base panel 4, and between the upper and lower surface coverings 16, 18 of the base panel 4. The base frame 28 The base frame 28 may extend only along the rear edge 22 of the base panel 4, or it may be U-shaped and extend along the rear, left, and right edges of the base panel 4, or it may be rectangular and extend around the entire perimeter of the base insert 26 within the base panel 4. In some embodiments, the base frame 28 may be a unitary structure that is bent or otherwise formed into the shape of the base frame 28. In other embodiments, the base frame 28 may be a contiguous structure, for example, a structure made up of smaller lengths, such as two side pieces connected to lateral ends of a back piece. The base frame 28 may be designed to aid in maintaining the shape of the base panel 4 and define a rigid structure for the base. In some embodiments, the base frame 28 may comprise a rigid bar or rod structure (e.g., of steel, aluminum, or other metal, graphite or other composite material, etc.) with sufficient tensile strength to provide structural reinforcement for attachment of one or more tethers and/or straps. In some embodiments, the rod or bar structure forming the base frame 28 may be separate from the base insert 26, and in other embodiments may be attached to the base insert 26.

Figure 17E:
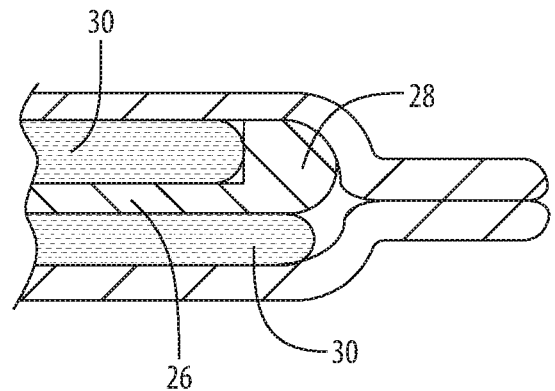

In some cases the base frame 28 may be in contact with the base insert 26. In some embodiments, the base frame 28 and base insert 26 may be a unitary structure. For example, as shown in FIG. 17E, the base frame 28 and base insert 26 may be formed monolithically from a hard plastic or a metal sheet. In other embodiments, the base frame 28 and base insert 26 may be separate structures and the base insert 26 may be configured to interact with the frame. For example the base insert 26 may define one or more clip and/or lip structures positioned at or near one or more edges of the base insert 26. The clip and/or lip structures may extend from a surface or edge of the base insert 26 toward the upper or lower surface coverings 16, 18 of the base panel 4. In these embodiments, the base frame 28 may be designed to sit on the surface of the base insert 26 and inside and/or outside the one or more lip structures, and/or within a clip. The base insert 26 and base frame 28 may also be made of metal. In other embodiments the base frame 28 and base insert 26 may be made of other materials from one another, e.g., the base frame 28 may be made of metal and the base insert 26 made of plastic, or the base insert 26 made of metal and the base frame 28 made of plastic. In embodiments in which the base frame 28 is separate from the base insert 26, the upper and lower surface coverings 16, 18 of the base panel 4 may be sewn together to create channels adjacent the perimeter of the base panel 4 in which the base frame 28 may be inserted and thereby held in position adjacent the perimeter of the base panel 4.

A compressible material 30 (e.g., a foam padding, down, stuffing, or the like) may be positioned between the upper and lower surface coverings 16, 18 of the base panel 4. In some embodiments the compressible material 30 may be positioned between the base insert 26 and the lower surface covering 18. In some embodiments, the compressible material 30 may also be positioned between the base insert 26 and the upper surface covering 16.

The compressible material 30 may aid in allowing the lower surface covering 18 of the base panel 4 to conform to the automobile seat and/or may aid in the comfort of the pet within the carrier. For example, the compressible material 30 may conform to the shape of the seat and/or carrier. In some embodiments, for example, wherein the pet carrier restraint 2 is collapsed and positioned against the seat back 202 of the seat 200, the compressible material 30 may enhance the comfort of an automobile passenger seated in front of the collapsed pet carrier restraint 2, which would be positioned behind the passenger's back. Additionally, in some embodiments the compressible material 30 may be positioned so as to assist in restraining movement of the carrier within the restraint as the carrier may "sink" into the compressible material. The compressible material may be positioned on both sides of the base insert 26 or may be positioned on one of the sides of the base insert 26 depending on the desired cushioning or restraint desired.

The upper and/or lower surface coverings 16, 18 of the base panel 4 may be made from suitable synthetic or natural materials. In some embodiments, the upper and lower surface coverings 16, 18 of the base panel 4 are made of durable fabrics comprising synthetic polymers. In many embodiments, the lower and/or upper surface coverings 18, 16 may comprise a non-skid or high friction coefficient material. The lower and/or upper surface coverings 18, 16 may be manufactured of a non-skid material or the non-skid material may be applied to the surfaces. Non-skid material on the upper surface covering 16 of the base panel 4 may further aid in preventing or reducing movement of the pet carrier relative to the pet carrier restraint 2. In some embodiments non-skid material on the lower surface covering 18 of the base panel 4 may aid in preventing or reducing movement of the pet carrier restraint 2 relative to the automobile.

Front Panel

The front panel 6 is designed to prevent or reduce movement of the pet carrier toward the front of the vehicle upon a sudden stop. That is, the front panel 6 defines a front wall or structural feature that prevents the carrier from moving past the front panel 6. This may prevent the pet carrier from falling off the edge of the seat or otherwise sliding along the seat in an undesirable manner.

In many embodiments, the front panel 6 may define a front surface covering 32, a back surface covering 34, a bottom edge 38, a top edge 36, a left side edge and a right side edge. The front panel 6 may be connected along the bottom edge 38 to the front edge 20 of the base panel 4 in a hinged connection 48 (i.e., the front panel and the base panel are movable relative to each other). The seam 66 connecting the front surface covering 32 to the back surface covering 34 at the bottom edge 38 may be sewn or otherwise fastened to the seam 66 connecting the upper surface covering 16 to the lower surface covering 18 to form the hinged connection 48. In another embodiment, the back surface covering 34 and the upper surface covering 16 may be a single piece of material and the front surface covering 32 and the lower surface covering 18 may also be a single piece of material, whereby the single pieces of material merely fold between the base panel 4 and the front panel 6 to form the hinged connection 48.

The front panel 6 may comprise a front insert 42 and a front frame 44 and is similar in construction to the base panel 4 with the exception that a compressible material 30 is generally not provided between the front and back surface coverings 34 (although it could be). The front frame and front insert 42 are shown in cross section in FIG. 17. As with the base panel 4, the front and/or back surface covering 34 of the front panel 6 may be made from durable fabrics of any suitable synthetic or natural materials. A connector 46 such as a D-ring may be affixed to the front surface covering 32 of the front panel 6 for use in securing a pet carrier 100 within the pet carrier restraint 2 as further described below. The connector 46 may be positioned in a substantially central region of the front panel 6 and may be sufficiently supported on a top edge of the front panel 6 to allow easy access to the connector 46 to assist a user in securing and removing the carrier from the carrier restraint. Additionally, by locating the connector in a central area, the carrier (when secured to the restraint 2) may be secured to a central area of the restraint 2, which may provide even force distribution and assist in maintain the carrier in a desired position.

The front frame 44 of the front panel 6, similar to the base frame 28 of the base panel 4, may also aid in resisting and distributing restraint forces to other parts of the pet carrier restraint 2 upon a sudden stop by the vehicle. In many embodiments the front frame 44 of the front panel 6 may be formed of a rigid rod or bar in the same manner as the base frame 28. The front frame 44 may be positioned along the top edge 36 of the front panel 6 only, or it may be U-shaped and extend along both the top edge 36 and the left and right side edges 40a/b, or it may be rectangular and extend around the perimeter of the front panel 6. In some embodiments the connector ring 46 at the top edge 36 of the front panel 6 may be connected with the front frame 44 to transfer forces through the ring to and from the front frame 44. The frame may be a contiguous structure or a unitary structure.

Side Panels

Side panels 8a/b or sidewalls connect the base panel 4 and the front panel 6. The side panels 8a/b define the left and right boundaries of the carrier cavity 17. In some embodiments, the side panels may extend substantially perpendicularly relative to the front panel and the base panel and define lateral walls for the pet carrier restraint 2. The side panels 8a/b may extend only partially the length of the floor panel and may terminate prior to a back edge of the floor panel. The side panels 8a/b may be connected to the base panel 4 such that the side panels 8a/b extend along each respective side edge to a position adjacent an end of the rigid front frame of the base panel 4.

In some embodiments, the side panels 8a/b may be substantially triangular in shape and may be respectively attached along a first edge to the lateral edges of the base panel 4 and may also be respectively attached along a second edge to a left or right side of the front panel 6. Thus, for example, the right side panel 8b may have a first, front edge 50 that is parallel the to the right edge of the front panel 6, a second, bottom edge 52 that is parallel to the right edge of the base panel 4, and a third, top edge 54 that, in the non-collapsed configuration of the carrier restraint, is at an angle relative to both the front panel 6 and the lateral side edges 24a/b of the base panel 4. In these embodiments, in the expanded position, the height of the side panels may taper from its connection to the front panel 6 as they transition to its terminal end connected to the base panel. In some embodiments, as shown in FIGS. 1, 2, and 4-9, side-securing strap 14 may be attached to the each side panel 8a/b. In some embodiments, the side-securing strap 14 may also extend along each side panel 8a/b to further connect with the base panel 4. The side securing straps 14, or other fastening mechanisms, may be connected to the side panels 8*a/b* in the center area of the top edge 54 of each panel.

In the expanded position, the side panels 8*a/b* are arranged in a first or maximum position relative to the base panel 4 and the front panel 6. In this position, the side panels 8*a/b* restrict movement of the hinged connection between the base panel and the front panel as will be discussed in more detail below.

To aid in collapsing the pet carrier restraint 2, the side panels 8*a/b* may not be permanently rigid. In many embodiments, the side panels 8*a/b* may lack an insert, or may include an insert that may be folded along a fold seam 56 or panel hinge, or may include an insert that is in two parts. A non-rigid or partially flexible side panel 8*a/b* may allow the side panel 8*a/b* to be folded such that the front and bottom edges 50, 52 of the side panels 8*a/b* are proximal to and parallel to each other. This allows the front panel 6 to be folded against and parallel to the base panel 4.

Securing Fasteners

The carrier restraint may include a plurality of securing fasteners that may be used to secure the carrier restraint to the vehicle and/or restrain the carrier to the carrier restraint. The securing fasteners may often be adjustable in at least one dimension to allow the carrier restraint to be used with a variety of different vehicles and pet carriers. In some embodiments, the securing fasteners may include a plurality of tethers and/or straps may be fixed at one or more edges of the pet carrier restraint 2. In many embodiments, the tethers and straps may be designed to secure the pet carrier restraint 2 to the vehicle, or to secure the pet carrier 100 to the pet carrier restraint 2.

Figure 3:
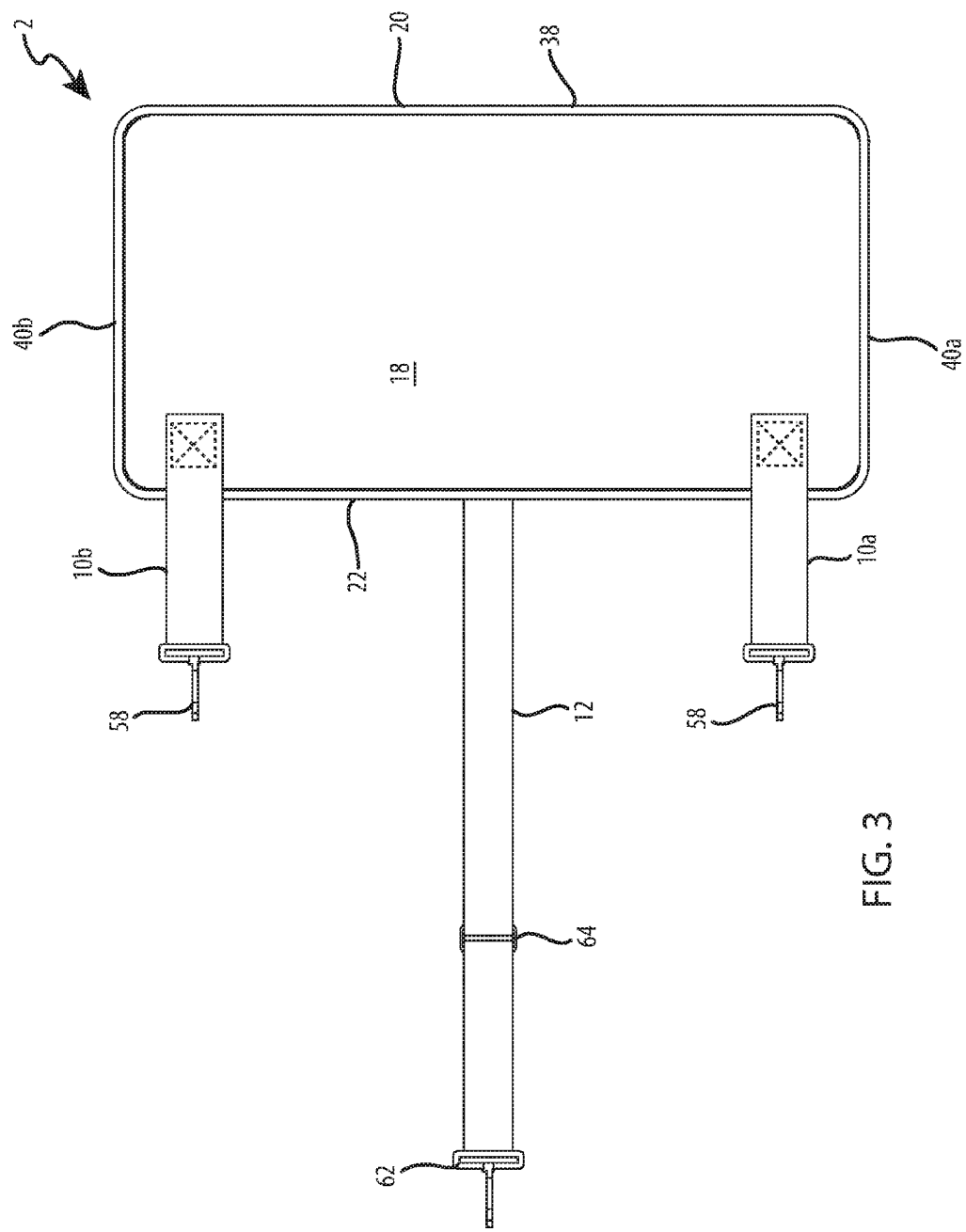
FIG. 3 is a bottom plan view of the pet carrier restraint of FIG. 1.
Figure 18:
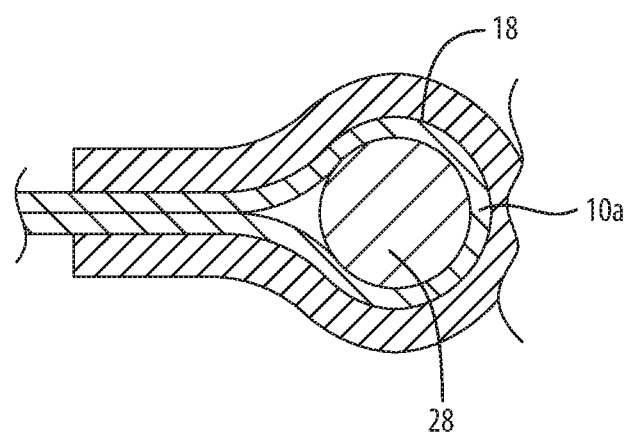
FIG. 18 is a simplified cross section taken along line 18-18 in FIG. 1.

Anchor tethers 10*a/b* or anchoring fasteners may be used for attaching the pet carrier restraint 2 to attachment structures in the vehicle extend from the rear of the base panel 4. The anchor tethers 10*a/b* may be formed of nylon webbing or other similar woven material with high tensile strength. In some embodiments, such as shown in FIG. 3, first ends of the anchor tethers 10*a/b* may be affixed to the lower surface covering 18 of the base panel 4 with a box stitch. In other embodiments, the anchor tethers 10*a/b* may alternatively or additionally be attached by rivets or other fasteners to the base panel 4, e.g., by passing through the base insert 26 (and optimally inside of the base frame 28) for increased structural strength. In some embodiments the anchor tethers 10*a/b* may directly or indirectly engage the bar or rod of the base frame 28 near the rear edge 22 of the base panel 4. In some embodiment the anchor tethers 10*a/b* may engage the base frame 28 by wrapping the anchor tethers 10*a/b* around the base frame 28 (see, e.g., FIG. 18), or by mechanically connecting the anchor tethers 10*a/b* to the base frame 28, or by otherwise securing the anchor tethers 10*a/b* to it, for example by rivet, grommet, box stitch, etc. In most embodiments this engagement may withstand 100 pounds of force or greater.

A fastener 58 is secured to the opposite end of each anchor tether 10*a/b* distal to the rear edge 22 of the base panel 4 edge. The fastener 58 is configured for attachment with an attachment point 208 in a vehicle restraint system (e.g., the LATCH system). In many cases, the fastener 58 is constructed of metal, alloys, or strong plastics, and may be a hook fastener of the type used to secure children's car seats to attachment points 208 in a vehicle. In many embodiments, two anchor tethers 10*a/b* may extend from the base panel 4 laterally spaced apart along the rear edge 22 a distance determined to most appropriately coincide with a typical separation distance of lower anchors 208 in the seat bight 206 in child safety seat vehicle restraint systems. The length of the anchor tethers 10*a/b* may be adjusted greater or lesser where necessary to engage the vehicle restraint system and to tighten the pet carrier restraint 2 firmly against the seat 200. The length of the anchor tethers 10*a/b* may be adjustable, for example, by a metal or plastic strap adjuster.

One or more over-carrier straps 12 may be used to hold the pet carrier in the pet carrier restraint 2. As with the anchor tethers 10*a/b*, the over-carrier strap 12 may be made of a nylon mesh or similar material with high tensile strength. As shown in FIG. 1, the over-carrier straps 12 may be attached at or near the rear edge 22 of the base panel 4, and the length of the over-carrier strap 12 may be adjustable. In some embodiments, the over carrier strap 12 may engage the base frame 28 within the base panel 4 and/or front frame 44 in the front panel 6 by any suitable mechanical method. In some embodiments the over-carrier strap 12 may be configured to thread through one or more handles 102 of the pet carrier 100. A hook fastener 62 may be attached to the free end of the over-carrier strap 12 and may be designed to engage the D-ring anchor structure 46 attached adjacent to the top edge 36 of the front panel 6. In other embodiments an over-carrier strap 12 may have an opposite orientation, wherein the over-carrier strap 12 may be attached adjacent to the top edge 36 of the front panel 6, with a fastener 62 positioned at the opposite end of the over-carrier strap 12 to engage an anchor ring positioned at the rear edge 22 of the base panel 4.

In some embodiments, the over-carrier strap 12 may comprise two pieces: one piece may be attached at or near the top edge 36 of the front panel 6 and the other piece may be attached at or near the rear edge 22 of the base panel 4. The two pieces may be connected together by a buckle structure or other suitable connecting device at an intermediate position around the pet carrier. In other embodiments, the pet carrier restraint 2 may include more than one over-carrier strap 12, which may have opposite orientations and various methods of engaging and connecting the top edge 36 of the front panel 6 to the rear edge 22 of the base panel 4.

The over-carrier strap 12 may define a length that may be adjustable by the user. In many embodiments, over-carrier straps 12 with modifiable lengths may allow the pet carrier restraint 2 to restrain pet carriers 100 of various styles, sizes, and shapes. In some embodiments, length adjustment may be accomplished by use of a strap adjuster, for example a slide adjuster. Other methods for reversibly connecting the rear edge 22 of the base panel 4 and the tope edge of the front panel 6 are also possible, for example, by a buckle structure (side release, center release, cam, etc.), or by hook and loop structures.

Side-securing straps 14 may aid in removably connecting the sides of the pet carrier and the pet carrier restraint 2. In many embodiments, the side-securing straps 14 may be attached at or near the side of the carrier restraint. In some embodiments, as shown in FIG. 1, the side-securing straps 14 are fixed to an upper edge of a side panel 8*a/b*. In other embodiments, the side-securing straps 14 may also be attached to the lateral side edges 24*a/b* of the base panel 4.

Assembly and Installation

The base panel 4 may be connected to the front panel 6 and the two side panels 8*a/b* may be connected to the base and front panels 4, 6. For example, a bottom edge of the front panel 6 may be connected alone a front edge 20 of the base panel 4 and extend along substantially the entire length of the base panel 4. The two side panels 8*a/b* may be connected such that front edge 50 is connected to and extends parallel with the interior surface of the front panel 6 and the bottom edge 52 is connected to and extends parallel with the top surface 16 of the base panel 4. The top edge 54 of the two side panels 8a/b extends at an angle from the top connection to the front panel 6 to the bottom connection to the base panel 4.

As discussed above, the over the carrier strap 12 may be connected at approximately a center of the rear edge 22 of the base panel 4. The two anchor straps 10a/b may be connected on opposite sides of the over the carrier strap 12 and may be positioned adjacent the terminal edges of the base panel 4. In this manner, the anchor straps 10a/b may secure the edges of the carrier restraint 2 while the carrier strap 12 may secure the carrier to the carrier restraint 2.

With reference to FIGS. 1-7, in the expanded position of the carrier restraint 2, a tensegrity structure may be formed between the front frame 44 along the upper edge of the front panel 6, the side panels 8a/b, the base panel 4, and the over-carrier strap 12 to provide a strong restraint for the maintaining the pet carrier 100 within the pet carrier restraint 2. The front frame 44 is placed under tension at each lateral end along the third, angled edge of the side panels 8a/b to a termination point at the base panel 4, which helps resist the tension and compression forces exerted by the over-carrier strap 12 and the front panel 6 itself as the force of the accelerating pet carrier impacts each during a sudden stop, change in direction, or impact by the vehicle.

Installation of the Carrier Restraint System

Figure 11:
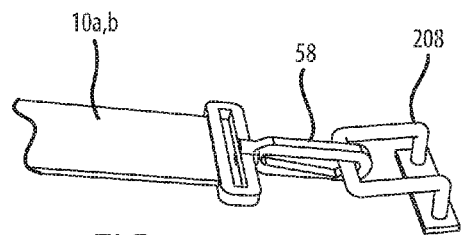
FIG. 11 is an enlarged view of a portion of the engagement of the pet carrier restraint as indicated in FIG. 10.
Figure 10:
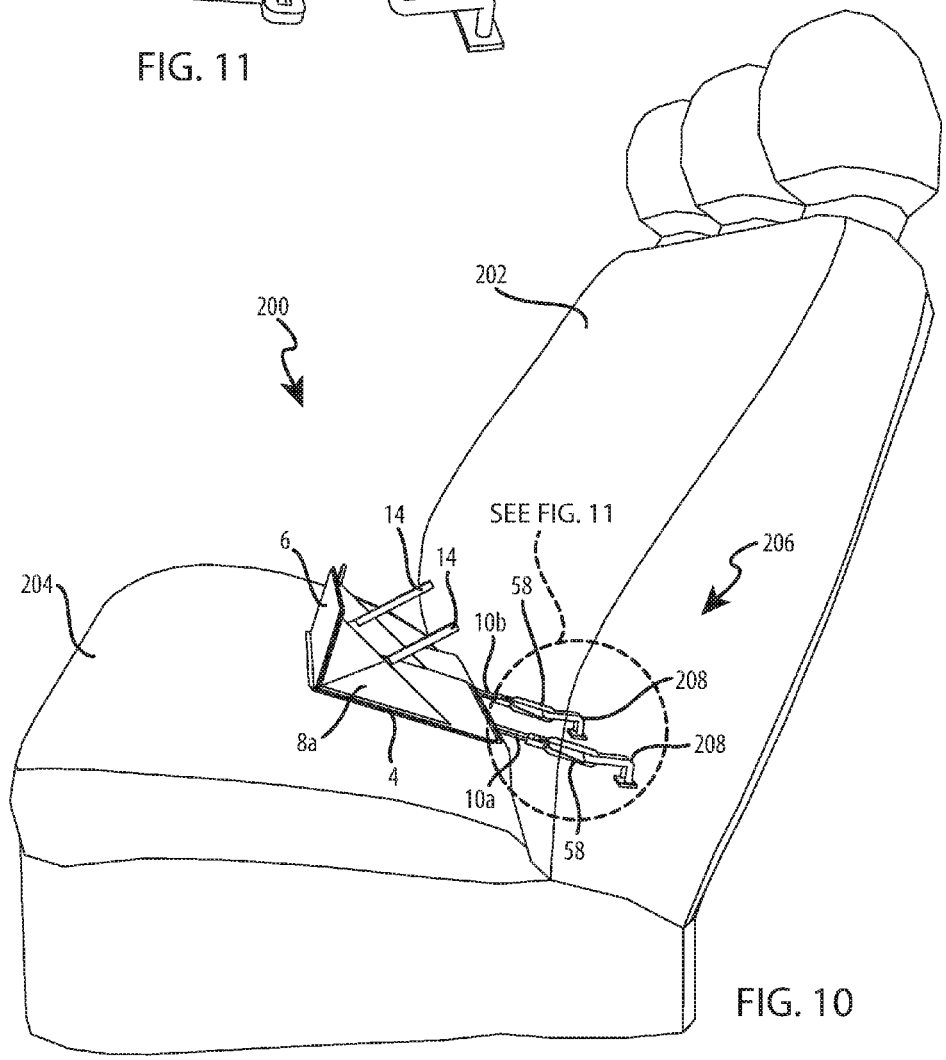
FIG. 10 is a right side isometric view the pet carrier restraint of FIG. 1 engaged with a car seat latch system.
Figure 12:
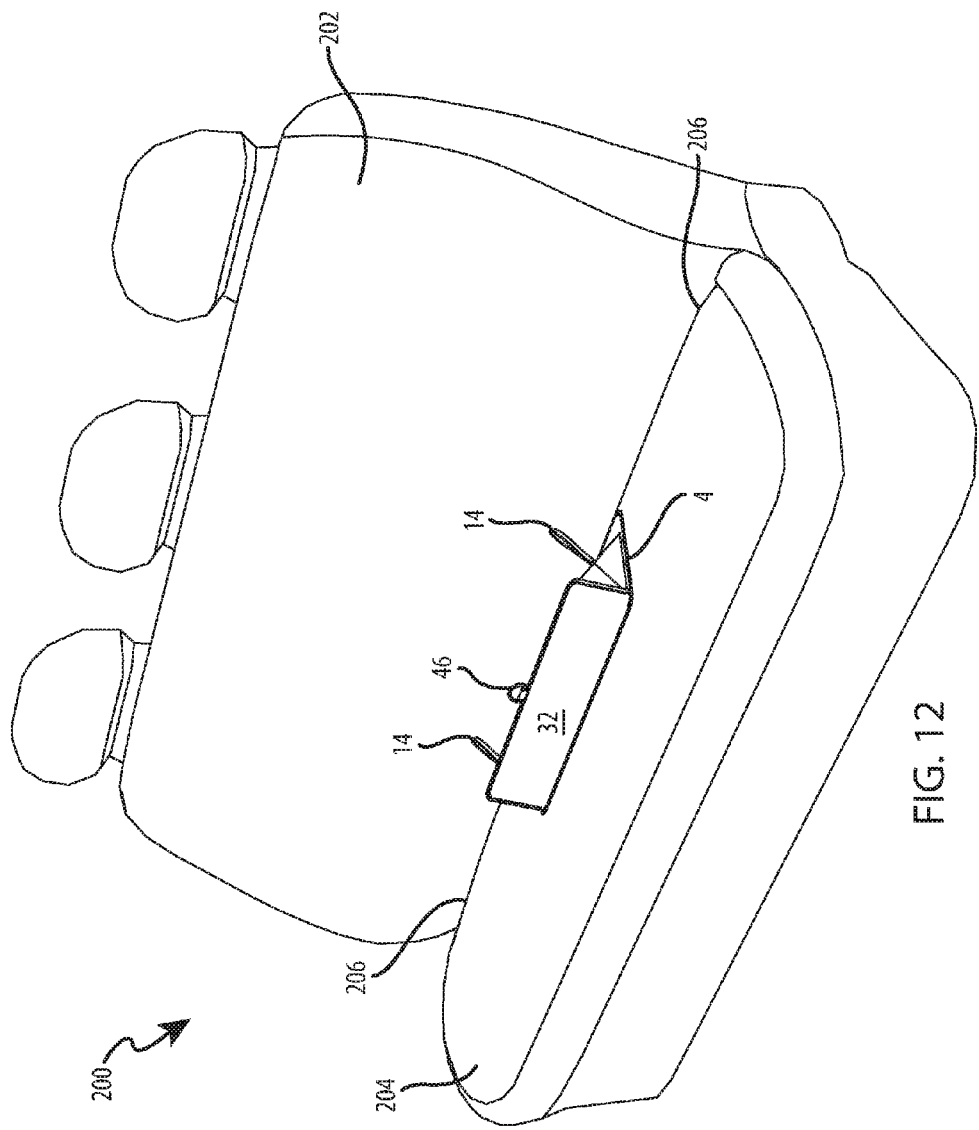
FIG. 12 is a front isometric view of the pet carrier restraint positioned on an automobile seat.

Installation of the carrier restraint 2 within a vehicle will now be discussed in more detail. FIG. 10 is a perspective view of the carrier restraint installed on a rear seat of a vehicle. FIG. 11 is an enlarged view of FIG. 10 illustrating the connection to the latch features within the vehicle. With reference to FIGS. 10 and 11, the pet carrier restraint 2 may be arranged so that the base panel 4 is seated on the top surface of the seat cushion 204 of the seat 200. The front panel 6 may be positioned towards a front edge of the seat cushion 204 and spaced apart from the seat bight 206. In other words, the front edge is separated from the seat back 202 by the width of the base panel 4.

To secure the carrier restraint 2 to the vehicle, the anchor straps 10a/b may engage two lower anchor points 208 located within the seat bight 206 (where the seat back 202 and the seat cushion 204 of the seat 200 meet)(See FIG. 10.). That is, a user extends the anchor straps 10a/b into the seat bight 206 to access and connect to the anchor points 208. The anchor points 208 may typically be latches or other fastening components that are installed within the vehicle. In some embodiments, the pet carrier restraint 2 may engage an upper or top anchor point of a child safety seat system, which may be positioned above or behind the seat 200. In other embodiments, the pet carrier restraint may be secured to other locations and/or components within the automobile.

Collapsibility

Figure 8:
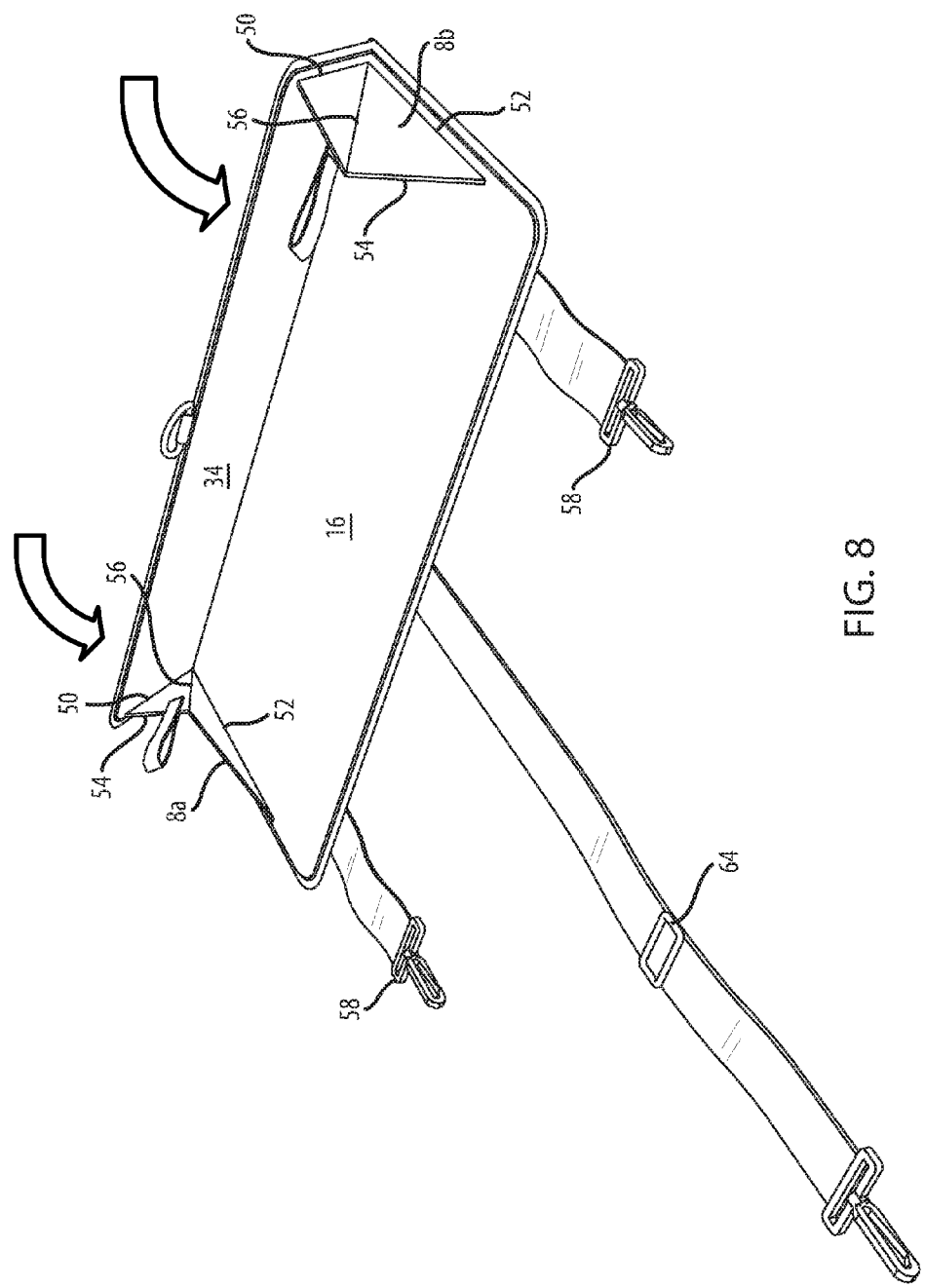
FIG. 8 is a partially collapsed rear isometric view of the pet carrier restraint of FIG. 1.
Figure 9:
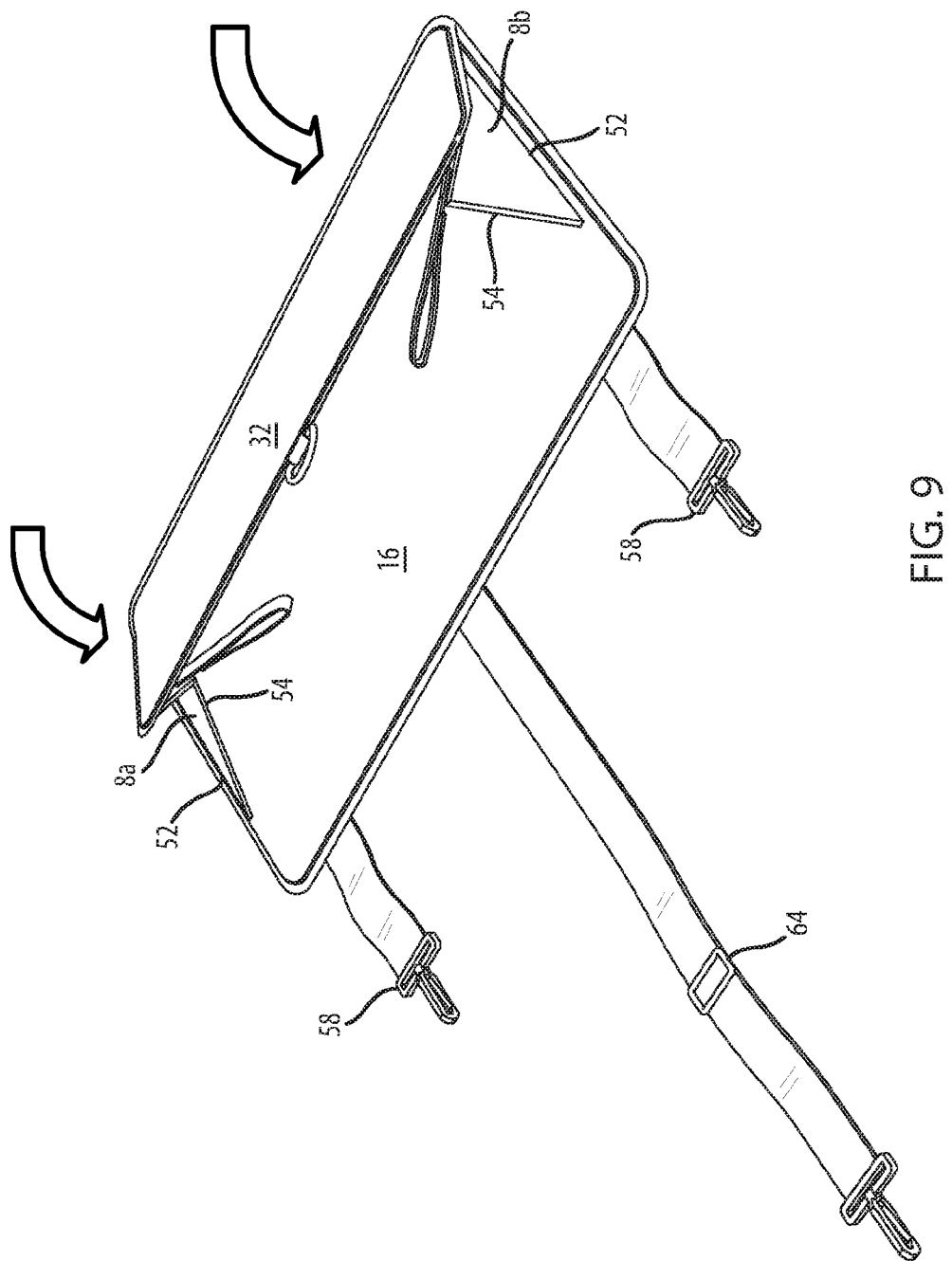
FIG. 9 is a further partially collapsed rear isometric view of the pet carrier restraint of FIG. 8.

The disclosed pet carrier restraint 2 may be folded or collapsed when not in use, that is when a pet carrier is not seated on the base panel 4. In some embodiments, collapsing the pet carrier restraint 2 may aid in storage and or convenient transport. FIGS. 8 and 9 illustrate the carrier restraint 2 as it is collapsed. With reference to FIG. 8, collapse may be initiated by tilting the front panel 6 such that that the top edge 36 of the front panel 6 is moved toward the rear edge 22 of the base panel 4. As discussed above, the side panels 8a/b may be folded along a bisecting fold seam 56 or other hinge between the first, front edge 50 and the second, bottom edge 52 of each side panel 8a/b to allow collapse of the front panel 6 onto the base panel 4. In some embodiments, as in FIGS. 8 and 9, the side panels 8a/b fold inward toward each other to allow collapse and transition from the expanded or first position into the second or collapsed position. In other cases the side panels 8a/b may fold outward or a combination thereof.

A collapsed pet carrier restraint 2 may be positioned against the seat back 202 of the seat 200 by elevating the front edge 20 of the base panel 4 and pivoting the pet carrier restraint 2 along the back edge of the base panel 4 toward the seat back 202. FIG. 9 shows the collapse of one embodiment of the carrier restraint that has progressed beyond that shown in FIG. 8. FIGS. 13 and 14 show an embodiment of the pet carrier restraint 2 wherein folding the pet carrier restraint 2 allows the pet carrier restraint 2 to be positioned against the seat back 202 of the seat 200. The compressible material 30 lining the lower surface covering 18 of the base panel 4 is thereby positioned adjacent to the back of a passenger seated in front of the pet carrier restraint 2 to provide a cushioned surface for the passenger to sit against. This may allow a human passenger to be seated in front of the collapsed pet carrier restraint 2, and may prevent the carrier restraint from interfering with the passenger's use of seat belt restraints. In many embodiments, the pet carrier restraint 2, when collapsed and positioned against that 202 back may continue to be connected by the anchor tethers 10a/b to the lower restraint anchors 208 in the seat bight 206. Thus, when needed again, the pet carrier restraint 2 may be pivoted downward so that the base panel 4 is positioned on the seat cushion 204 and the front panel 6 is unfolded such that it is generally perpendicular to the base panel 4.

Securing a Pet Carrier

Securing of a pet carrier or crate within the carrier restraint 2 will now be discussed in more detail. FIGS. 15A-16B illustrate various stages of a pet carrier 100 being secured into the carrier restraint 2. It should be noted that although FIGS. 15A-16B illustrate the pet carrier 100 being connected to the carrier restraint 2 outside of a vehicle (and with the anchor straps disconnected) in many embodiments a user may choose to position and secure a pet carrier 100 into the restraint 2 after the restraint 2 has been installed in the vehicle. However, in some instances the carrier restraint 2 may be installed into the vehicle after the pet carrier 100 has been secured thereto.

A pet carrier 100, as used herein may refer to a bag, crate, container, or luggage item designed to aid in the transportation of an animal. In many embodiments, the animal may be a pet, for example, without limitation, a dog or cat. The disclosed pet carrier restraint 2 may be designed for use with pet carriers 100 for animals. Such pet carriers 100 are generally of a rectangular cuboid shape similar to a small duffle bag or, alternatively, a crate. Such pet carriers 100 may be generally soft, flexible, rigid, stiff, hard, or a combination thereof. Pet carriers 100 may be manufactured from a variety of materials including natural and synthetic materials, for example fabrics, textiles, plastics, metals, and/or metal alloys. In one example, a soft pet carrier 100 may have flexible fabric sides, a mesh top, and a rigid bottom. In many embodiments, the pet carrier 100 may be designed to be carried by handles 102 and/or shoulder straps. In some embodiments, the shoulder strap may engage the pet carrier 100 at one or more anchor points 104 positioned at or near the top of the pet carrier wherein the anchor points are located at or near the front and rear ends of the pet carrier.

With reference to FIGS. 15A and 15B, the pet carrier 100 may be positioned on the top surface of the base panel 4 and positioned between the two side panels 8a/b and positioned against the interior surface of the front panel 6. To secure the pet carrier 100, a person secures the side straps 14 on the two side panels 8a/b to corresponding latches or fasteners on the pet carrier 100, such as tow D-ring connectors 104 on opposing ends of the pet carrier 100. The side straps 14 may be connected to the pet carrier 100 in a variety of manners and may depend on the type of pet carrier 100 used with the pet carrier restraint 2. In some examples, the side-securing straps 14 may be designed to engage a shoulder strap ring on the pet carrier, for example, a D-ring. In some cases the side-securing straps 14 may comprise a fastener at the free end that may clip to the D-ring. In these embodiments, the side-securing straps 14 may also comprise a slide adjuster for modifying the length of the side-securing straps 14. In some embodiments, for example as shown in FIG. 1, the side-securing straps 14 may include hook and loop structures on the straps 14, such that the each side-securing strap 14 may be threaded through the shoulder strap ring 104 and then folded back over itself to engage the hook and loop fastening structure.

Figure 16A:
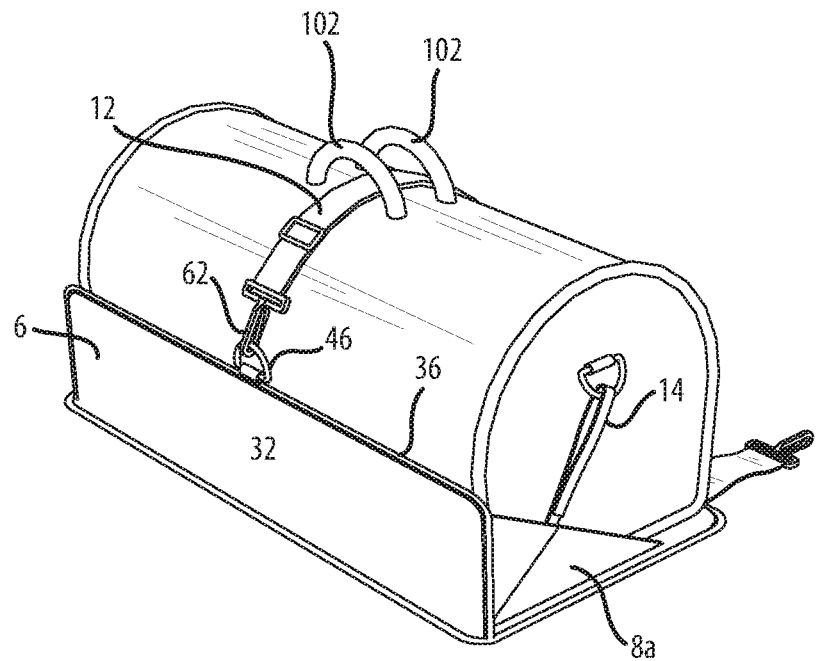
FIG. 16A is a front, right isometric view of the pet carrier restraint of FIG. 15A with the over-carrier securing strap engaged.
Figure 16B:
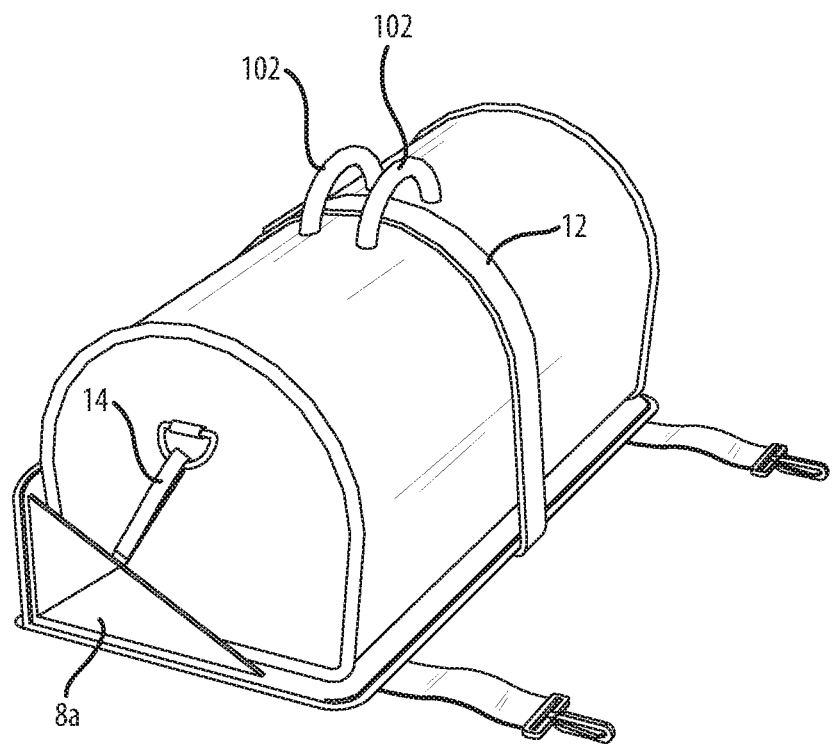
FIG. 16B is a left isometric view of the pet carrier restraint of 16A.

With reference now to FIGS. 16A and 16B, after or before the side straps 14 are connected to the ends of the pet carrier 100, the over the carrier strap 12 may be extended over the top surface of the carrier 100 and secured to the carrier connector 46 on the front panel 6. Depending on the configuration of the carrier 100, the over the carrier strap 12 may extend over the top surface and optionally thread through or engage one or more carrier features. For example, as shown in FIGS. 16A and 16B, the over the carrier strap 12 may extend through the handles 102 of the carrier 100. In this configuration, the handles 102 may limit the lateral movement of the carrier strap 12. After the side straps 14 and the over the carrier strap 12 are connected to secure the carrier 100, the carrier 100 may be substantially secured within the carrier restraint 2. Because the carrier restraint 2 may then be or may previously have been secured within the vehicle, the carrier restraint 2 acts to secure the carrier 100 during transportation within the vehicle. This helps to reduce injuries to a pet received within the carrier 100 in the event of an accident, sharp turns, sudden stops, or other sudden changes in direction or speed. In particular the rigidity of the carrier restraint 2 and its connection to the various anchors 108 helps to prevent movement of the carrier 100.

CONCLUSION

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A pet carrier restraint comprising:
   a base panel with a front edge, a rear edge, and lateral edges, the base panel comprises
      a rigid, planar base insert positioned between an upper base surface covering and a lower base surface covering, wherein the base insert provides a form for the base panel; and
      a rigid base frame extending along at least the back edge of the base panel;
   a front panel with a bottom edge, a top edge, and side edges and attached at the bottom edge to the front edge of the base panel in a hinged connection;
   two side panels, each extending between a respective lateral edge of the base panel and a respective side edge of the front panel to restrict movement of the hinged connection to a maximum position of perpendicular between the base panel and the front panel;
   one or more anchor tethers attached to and extending from the base panel for securing the pet carrier restraint to a vehicle restraint system in a seat bight of a seat in a vehicle; and
   one or more straps attached to and extending from the pet carrier restraint for securing a pet carrier to the pet carrier restraint.

2. The pet carrier restraint of claim 1, wherein each of the side panels is configured to fold along a seam positioned between a first edge of each side panel joined to the respective side edge of the front panel and a second edge of each side panel joined to the respective lateral edge of the base panel.

3. The pet carrier restraint of claim 2, wherein
   the front panel comprises a front surface covering;
   the front panel is configured to fold along the hinged connection such that the front surface covering is substantially parallel and adjacent to the upper base surface covering;
   the side panels are configured to collapse and are positioned between the front panel and the base panel when folded along the seam; and
   the base panel is configured to pivot upward along the rear edge such that the upper base surface covering of the base panel and the front surface covering of the front panel are positioned adjacent to and general parallel with a seat back of a seat in a vehicle.

4. The pet carrier restraint of claim 1, wherein a respective one of the straps is attached to and extends from a respective one of the two side panels.

5. The pet carrier restraint of claim 1, wherein the front panel further comprises a rigid front frame that extends along at least the top edge of the front panel.

6. The pet carrier restraint of claim 5, wherein the rigid front frame is in the form of a metal rod or bar.

7. The pet carrier restraint of claim 5, wherein a top corner of each side panel extends along each respective side edge to a position adjacent an end of the rigid front frame.

8. The pet carrier of claim 1, wherein the lower surface covering of the base panel includes a non-slip material.

9. The pet carrier restraint of claim 1, wherein the base panel further comprises a layer of compressible material positioned between the base insert and the lower surface covering.

10. The pet carrier restraint of claim 1, wherein the base frame and the base insert are a monolithic piece of molded plastic.

11. The pet carrier restraint of claim 1, wherein the base frame is a metal rod or bar.

12. The pet carrier restraint of claim 1, wherein the front panel comprises a front frame along at least the top edge of the front panel.

13. The pet carrier restraint of claim 1, wherein the anchor tethers are fixed to the base panel, are connected to the base frame, and extend away from the base panel at the rear edge.

14. A pet carrier restraint comprising:
a base panel comprising a front edge, a rear edge, lateral side edges, an upper surface covering, a lower surface covering, a base insert, a compressible material, and a rigid base frame adjacent to the rear edge, wherein the base insert, the compressible material, and the base frame are positioned between the upper and lower surface coverings;
a front panel comprising a front surface covering, a back surface covering, a top edge, a bottom edge, right and left side edges, a front insert, a rigid front frame adjacent to the top edge, and a connector ring, wherein the front panel is hinged at the bottom edge to the front edge of the base panel, the connector ring is affixed to the front panel adjacent to the top edge, and the front insert and the front frame are positioned between the front surface covering and the back surface covering;
lateral side panels respectively attached to the left and right side edges of the front panel and a corresponding lateral side edge of the base panel;
one or more adjustable length anchor tethers for securing the pet carrier restraint to a vehicle restraint system, wherein the anchor tethers are fixed to the base panel and through the connection to the base panel are operably connected to the base frame, wherein the tethers further comprise a fastener structure at a free end of the tether away from the base;
one or more adjustable length over-carrier straps for securing a pet carrier to the pet carrier restraint, wherein the over-carrier strap is fixed to the base panel adjacent to the rear edge; and
one or more adjustable length side-securing straps fixed to a side panel and designed to engage a shoulder strap attachment structure on a pet carrier.

15. The pet carrier restraint of claim 14, wherein
the front panel is configured to fold along the hinge at the bottom edge such that the back surface covering is substantially parallel and adjacent to the upper surface covering;
the side panels are configured to collapse and fold between the front panel and the base panel along a seam positioned between a first edge of each side panel joined to the respective side edge of the front panel and a second edge of each side panel joined to the respective lateral edge of the base panel; and
the base panel is configured to pivot upward along the rear edge such that the upper surface covering of the base panel and the front surface covering of the front panel are positioned adjacent to and general parallel with a seat back of a seat in a vehicle.

16. A pet carrier restraint system comprising:
a base panel with a front edge, a rear edge, and two lateral edges, the base panel comprising:
a rigid base insert that resists bending;
a surface covering received around the base insert; and
at least one rigid base frame member connected to the surface covering and extending around at least a portion of the rigid base insert;
a front panel with a bottom edge, a top edge, and side edges and attached at the bottom edge to the front edge of the base panel, the front panel comprising one or more rigid front frame members connected around at least a portion of a perimeter of the front panel;
two side panels, each side panel connected to a respective lateral edge of the base panel and a respective side edge of the front panel; and
one or more anchor tethers attached to and extending from the base panel for securing the pet carrier restraint system to a vehicle restraint system in a sight bight of a seat in a vehicle.

17. The pet carrier restraint system of claim 16, wherein the one or more anchor tethers are connected to a bottom surface of the at least one surface covering of the base panel.

18. The pet carrier of claim 16, wherein the at least one rigid base frame member follows a perimeter of the base panel.

19. A pet carrier restraint comprising:
a base panel with a front edge, a rear edge, and lateral edges, the base panel comprising;
an upper surface covering;
a lower surface covering;
a base insert positioned between the upper base surface covering and the lower base surface covering, wherein the base insert is planar and rigid and provides a form for the base panel; and
a base frame positioned between the upper base surface covering and the lower base surface covering, wherein the base frame comprises a first length of rigid bar positioned at or near the front edge and a second length of rigid bar positioned at or near the rear edge, where the first and second lengths are connected by a third length of rigid bar;
two anchor fasteners connected to the rear of the base panel for attaching the pet carrier restraint to a child safety seat anchoring system; and
at least one securing strap operably connected to the base panel for securing a pet carrier to the pet carrier restraint.

20. The pet carrier restraint of claim 19, wherein the first length of rigid bar is parallel to the front edge.

21. The pet carrier restraint of claim 19, wherein the second length of rigid bar is parallel to the rear edge.

22. The pet carrier restraint of claim 19, wherein the securing strap is an over-carrier strap with an adjustable length.

* * * * *